US008627866B2

(12) United States Patent
Mani (10) Patent No.: US 8,627,866 B2
(45) Date of Patent: Jan. 14, 2014

(54) TIRE AND WHEEL RIM ASSEMBLY (75) Inventor: Neel K. Mani, Stow, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 1018 days.

(21) Appl. No.: 12/351,377

(22) Filed: Jan. 9, 2009

(65) Prior Publication Data
US 2010/0175801 A1 Jul. 15, 2010

(51) Int. Cl.
*B60B 21/10* (2006.01)
*B60C 15/024* (2006.01)

(52) U.S. Cl.
USPC ........................................ 152/379.5; 152/544

(58) Field of Classification Search
USPC .............................................. 152/379.5, 544
See application file for complete search history.

(56) References Cited

U.S. PATENT DOCUMENTS

| 602,907 | A | | 4/1898 | Kunkle |
| 2,047,999 | A | | 7/1936 | Eger |
| 3,924,670 | A | * | 12/1975 | Tangorra et al. ............... 152/375 |
| 4,184,531 | A | | 1/1980 | Honigsbaum |
| 4,325,422 | A | | 4/1982 | Corner et al. |
| 4,878,527 | A | | 11/1989 | Noma |
| 5,016,697 | A | | 5/1991 | Noma et al. |
| 5,044,413 | A | | 9/1991 | Noma et al. |
| 5,065,803 | A | | 11/1991 | Nakatani et al. |
| 5,070,921 | A | | 12/1991 | Wada et al. |
| 5,129,439 | A | | 7/1992 | Wada et al. |
| 5,145,536 | A | | 9/1992 | Noma et al. |
| 5,232,033 | A | * | 8/1993 | Durif .......................... 152/381.4 |
| 5,232,034 | A | | 8/1993 | Gergele |
| 5,769,981 | A | | 6/1998 | Turley et al. |
| 5,971,047 | A | * | 10/1999 | Drieux et al. .................. 152/158 |
| 6,571,846 | B2 | * | 6/2003 | Chandezon et al. ........... 152/454 |
| 6,688,354 | B2 | * | 2/2004 | Drieux et al. .................. 152/158 |
| 6,807,993 | B2 | | 10/2004 | Pompier |
| 6,886,617 | B2 | * | 5/2005 | Eynard et al. .................. 152/544 |
| 6,929,046 | B1 | * | 8/2005 | Fontaine et al. ............... 152/539 |
| 7,225,846 | B2 | * | 6/2007 | Chung et al. .................. 152/539 |
| 2001/0032692 | A1 | * | 10/2001 | Nguyen et al. ............. 152/381.5 |
| 2002/0179216 | A1 | * | 12/2002 | Pereira et al. ................. 152/544 |
| 2004/0065397 | A1 | * | 4/2004 | Muhlhoff ....................... 152/151 |
| 2006/0130953 | A1 | * | 6/2006 | Poling ........................... 152/540 |
| 2006/0272761 | A1 | * | 12/2006 | Nakamura ..................... 152/540 |
| 2006/0289103 | A1 | * | 12/2006 | Suzuki .......................... 152/544 |
| 2008/0087364 | A1 | * | 4/2008 | Janin .............................. 152/544 |

FOREIGN PATENT DOCUMENTS

| FR | 2429111 | A | * | 2/1980 |
| JP | 05193312 | A | * | 8/1993 |
| JP | 07069010 | A | * | 3/1995 |
| WO | WO 0006399 | A1 | * | 2/2000 |

OTHER PUBLICATIONS

Poque, FR 2429111 A, Feb. 1980, Translation.*
Billieres et al., WO 0006399 A1, Feb. 2000, Translation.*

* cited by examiner

*Primary Examiner* — Ryan Ochylski
(74) *Attorney, Agent, or Firm* — Shaun J. Fox; Bryan Jaketic (57) ABSTRACT

A tire and wheel rim assembly comprising a wheel rim having flange portions and ledge portions, wherein each ledge portion has at least one circumferentially continuous groove with a circumferentially continuous surface. The assembly further includes a tire having bead regions comprising a ledge portion having a toe, a heel, and at least one circumferentially continuous rib with a peak, wherein the at least one circumferentially continuous rib of the tire extends radially into the at least one circumferentially continuous groove of the wheel rim.

23 Claims, 6 Drawing Sheets

TIRE AND WHEEL RIM ASSEMBLY

FIELD OF INVENTION

The present application is directed to a tire and wheel rim assembly. More particularly, the present application is directed to a tire and wheel rim assembly having a ribbed tire and a grooved wheel.

BACKGROUND

In known assemblies of a tire and a wheel rim, the tire includes substantially planar bead regions and the wheel rim includes bead seats or ledge portions. In an assembled and inflated condition, the bead regions of the tire hold the tire against the bead seats or ledge portions of the wheel rim. Additionally, friction force between the wheel rim bead seats and the tire bead regions assists in holding the tire and wheel rim assembly together.

SUMMARY

A tire and wheel rim assembly comprising a wheel rim having flange portions and ledge portions, wherein each ledge portion has at least one circumferentially continuous groove with a circumferentially continuous surface. The assembly further includes a tire having bead regions comprising a ledge portion having a toe, a heel, and at least one circumferentially continuous rib with a peak, wherein the at least one circumferentially continuous rib of the tire extends radially into the at least one circumferentially continuous groove of the wheel rim.

BRIEF DESCRIPTION OF THE DRAWINGS

In the accompanying drawings, several embodiments of a tire and wheel rim assembly are illustrated that, together with the detailed description provided below, describe various embodiments of the tire and wheel rim assembly. One of ordinary skill in the art will appreciate that a single element may be designed as multiple elements or that multiple elements may be designed as a single element.

Further, in the accompanying drawings and description that follow, like parts are indicated throughout the drawings and written description with the same reference numerals. The figures are not drawn to scale and the proportions of certain parts may have been exaggerated for convenience of illustration.

DETAILED DESCRIPTION

The following definitions are provided to aid in the understanding of the invention. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Bead core" refers to a bundle of circumferentially continuous steel wires located in each bead region.

"Bead region" refers to the part of the tire that contacts the wheel rim, contains the bead core, and defines a boundary of the sidewall.

"Circumferential" and "circumferentially" refer to a direction extending along the perimeter of the surface of the annular tread.

"Equatorial plane" refers to the plane that is perpendicular to the tire's axis of rotation and passes through the center of the tire's tread.

"Lateral" refers to a direction along the tread of the tire going from one sidewall to the other sidewall.

"Radial" and "radially" refer to a direction perpendicular to the axis of rotation of the tire.

"Sidewall" refers to that portion of the tire between the footprint of the tread and the bead.

Directions are also stated in this application with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms Such as "upper" and "lower" are used in connection with an element, the "upper" element is spaced closer to the tread than the "lower" element. Additionally, when relative directional terms such as "above" or "below" are used in connection with an element, an element that is "above" another element is closer to the tread than the other element. The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

Figure 1:
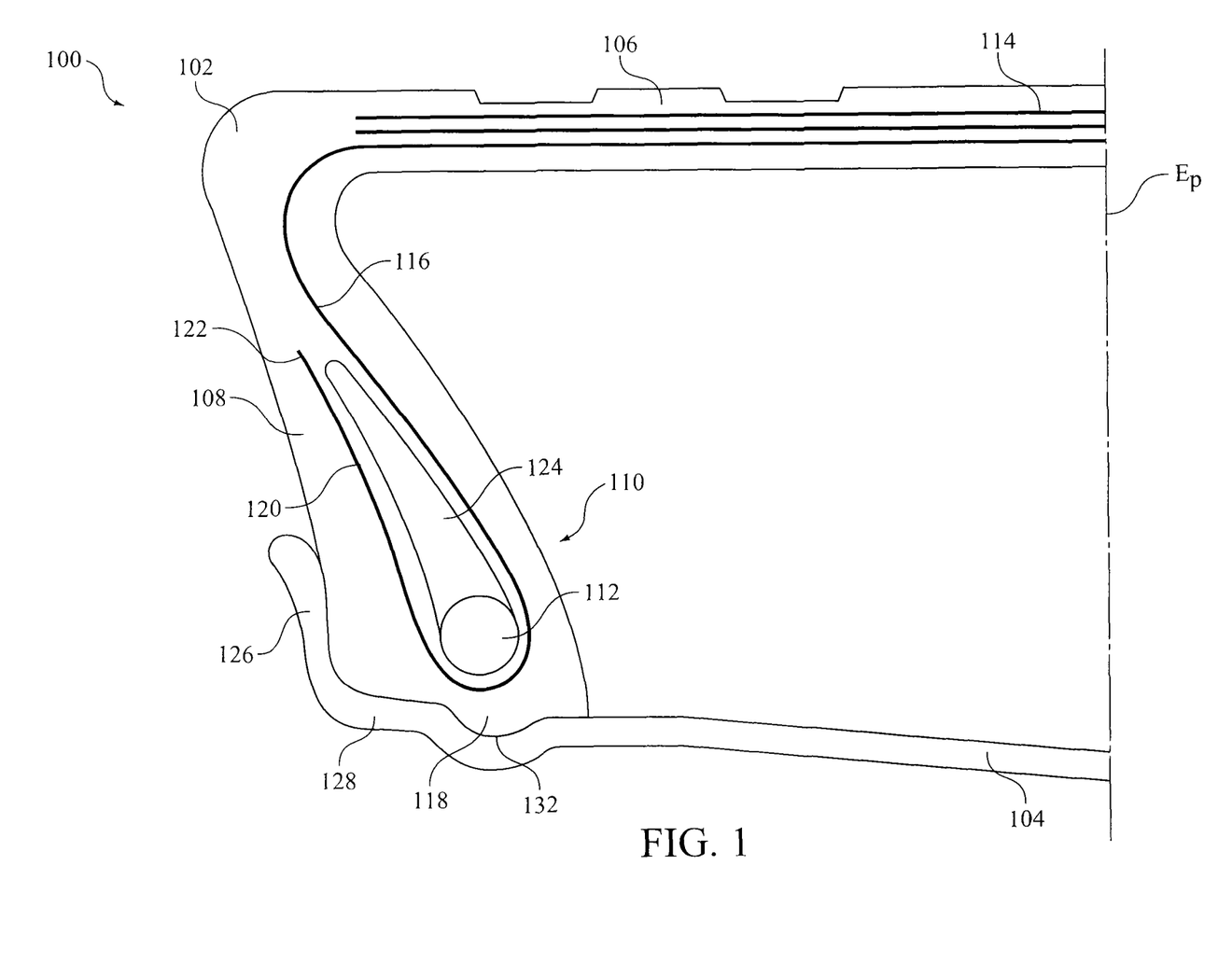
FIG. 1 illustrates a partial cross-section of one embodiment of a tire and wheel rim assembly.

FIG. 1 illustrates a partial cross-section of one embodiment of a tire and wheel rim assembly 100. Tire and wheel rim assembly 100 includes a tire 102 and a wheel rim 104. The tire 102 in FIG. 1 and the other embodiments discussed below, may be a pneumatic tire, including but not limited to, a runflat tire, a non-runflat tire, passenger vehicle tire, performance vehicle tire, recreation vehicle tire, construction vehicle tire, airplane tire, and the like. Although only an outer half of the tire and wheel rim assembly 100 is depicted in the drawing, it will be appreciated that the inner half of the tire and wheel rim assembly 100 is substantially a mirror image of the half depicted.

The illustrated tire 102 has an equatorial plane $E_p$ and includes a tread 106, a sidewall 108, a bead region 110 including a bead core 112, a belt portion that includes at least two belts 114, and at least one carcass ply 116 that extends circumferentially about tire 102 from one bead region 110 to the other bead region (not shown). The tire 102 further includes a single circumferentially continuous rib 118. The at least one carcass ply 116 is wound outwardly about bead core 112 and extends upwardly towards tread 106 to form at least one turn-up portion 120. The at least one turn-up portion 120 terminates at a turn-up end 122. In the illustrated embodiment, tire 102 includes a bead filler 124. In an alternative embodiment (not shown), the tire 102 includes a sidewall reinforcement; e.g., a runflat tire reinforcement ply and a non-runflat tire sidewall reinforcement ply.

With continued reference to FIG. 1, wheel rim 104 has a flange portion 126 and a ledge portion 128. In the illustrated embodiment, ledge portion 128 includes a single circumferentially continuous groove (see item 130 in FIG. 3) that comprises a circumferentially continuous surface 132 having a shape corresponding to the single circumferentially continuous rib 118.

Figure 2:
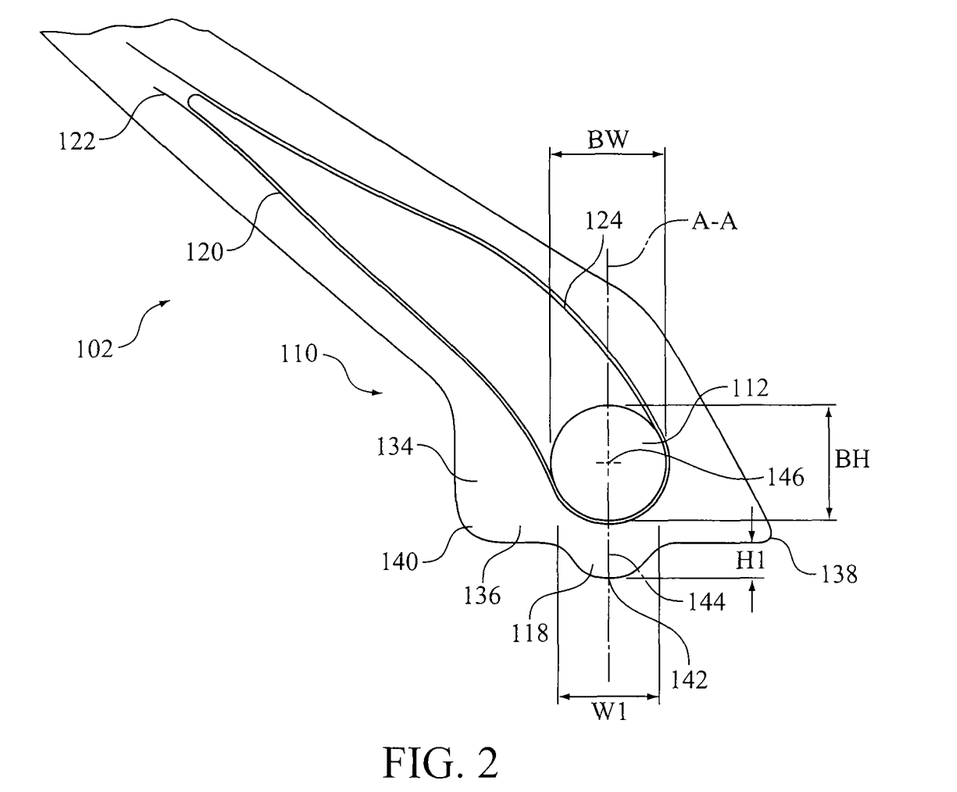
FIG. 2 illustrates a close-up cross-section of a bead region of a tire of the tire and wheel rim assembly of FIG. 1.

FIG. 2 illustrates a close-up cross-section of bead region 110 of tire 102 of tire and wheel rim assembly 100 illustrated in FIG. 1. In the illustrated embodiment, the bead region 110 comprises a flange portion 134 and a ledge portion 136. Ledge portion 136 further includes a toe 138, a heel 140, and rib 118 having a convex shape with a peak 142. The bead core 112 has a bead width BW and a bead height BH. Rib 118 has an axial width W1 and a radial height H1 defined by peak 142, wherein the axial width W1 is about 0.75 to about 1.5 times the bead width BW, and the radial height H1 is about 0.1 to about 1.0 times the bead height BH. In another embodiment, the axial width W1 is about 1.0 to about 1.25 times the bead width BW, and the radial height H1 is about 0.1 to about 0.5 times the bead height BH. In yet another embodiment, rib 118 has a convex shape that has a single radius, so the axial width W1 is about two times the single radius and the radial height H1 is about equal to the single radius. In another embodiment, rib 118 has a convex shape that has multiple radii. In another embodiment, rib 118 has a convex shape that consists of at least one radius and at least one straight line.

In yet another embodiment, the axial width W1 is about 1.1 to about 1.25 times the bead width BW, and the radial height H1 is about 0.5 to about 0.7 times the bead height BH. In another embodiment, the axial width W1 is about 1.1 to about 1.2 times the bead width BW, and radial height H1 is about 0.5 to about 0.6 times the bead height BH. In another embodiment, the axial width W1 is about 1.1 to about 1.15 times the bead width BW, and radial height H1 is about 0.1 to about 0.35 times the bead height BH.

Peak 142 of single circumferentially continuous rib 118 is axially located approximately at a midpoint 144 between toe 138 and heel 140 and radially at a location below bead core 112. In the illustrated embodiment, peak 142 of single circumferentially continuous rib 118 is aligned such that a plane A-A drawn through peak 142 of single circumferentially continuous rib 118 and a center 146 of bead core 112 is parallel with equatorial plane $E_p$ of tire 102. In an alternative embodiment (not shown), peak 142 of single circumferentially continuous rib 118 is offset axially outward from midpoint 144. In another alternative embodiment (not shown), peak 142 of single circumferentially continuous rib 118 is offset axially inward from midpoint 144. In other alternative embodiments (not shown), the entire circumferentially continuous rib 118 is offset axially inward or outward from midpoint 144.

In one embodiment, bead region 110 of tire 102 between toe 138 and heel 140 is made from a single material. In alternative embodiments, bead region 110 may be constructed of more than one material. In one known embodiment, the material has a JIS hardness from about 85 to about 92. Alternatively, the material may have a JIS hardness from about 92 to about 98.

Figure 3:
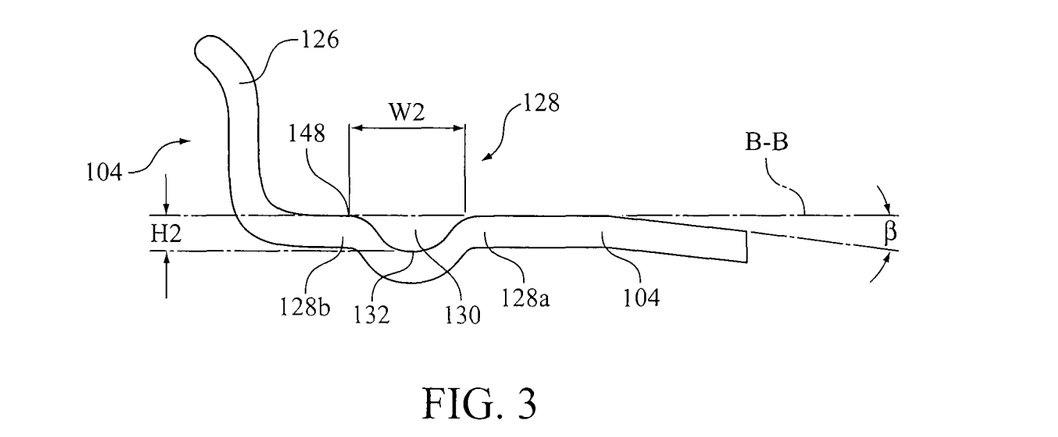
FIG. 3 illustrates a close-up cross-section of a flange portion and a ledge portion of a wheel rim of the tire and wheel rim assembly of FIG. 1.

FIG. 3 illustrates a close-up cross-section of flange portion 126 and ledge portion 128 of wheel rim 104 of tire and wheel rim assembly 100 illustrated in FIG. 1. Ledge portion 128 joins flange portion 126 to form a circumferentially continuous surface on both the inner and outer side of wheel rim 104. Ledge portion 128 includes a single circumferentially continuous groove 130 that forms a circumferentially continuous surface 132 in a concave shape. The concave shape of the circumferentially continuous surface 132 corresponds to the convex shape of single circumferentially continuous rib 118 of tire 102. Single circumferentially continuous groove 130 has an axial width W2 and a radial height H2. The axial width W2 is about 0.77 to about 1.52 times the bead width BW (illustrated in FIG. 2), and the radial height H2 is about 0.12 to about 1.02 times the bead height BH (illustrated in FIG. 2). In another embodiment, the axial width W2 is about 1.02 to about 1.30 times the bead width BW (illustrated in FIG. 2), and the radial height H2 is about 0.12 to about 0.55 times the bead height BH (illustrated in FIG. 2).

In yet another embodiment, the axial width W2 is about 1.12 to about 1.27 times the bead width BW (illustrated in FIG. 2), and the radial height H2 is about 0.52 to about 0.72 times the bead height BH (illustrated in FIG. 2). In another embodiment, the axial width W2 is about 1.12 to about 1.22 times the bead width BW (illustrated in FIG. 2), and the radial height H2 is about 0.52 to about 0.62 times the bead height BH (illustrated in FIG. 2). In another embodiment, the axial width W2 is about 1.02 to about 1.20 times the bead width BW (illustrated in FIG. 2), and the radial height H2 is about 0.12 to about 0.4 times the bead height BH (illustrated in FIG. 2).

In the illustrated embodiment, single circumferentially continuous groove 130 is located axially along ledge portion 128 defining an axially inner ledge portion 128a and an axially outer ledge portion 128b. Axially inner ledge portion 128a is at an angle β from about zero degrees to about ten degrees relative to a plane B-B that intersects an axially outer point 148 of single circumferentially continuous groove 130 where plane B-B is parallel with the axis of rotation of the wheel rim 104. In yet another embodiment, axially inner ledge portion 128a is at an angle β from about zero degrees to about six degrees relative to the plane B-B that intersects an axially outer point 148 of single circumferentially continuous groove 130 where plane B-B is parallel with the axis of rotation of the wheel rim 104. In another embodiment, axially inner ledge portion 128a is at an angle β from about zero degrees to about four degrees relative to a plane B-B that intersects an axially outer point 148 of single circumferentially continuous groove 130 where plane B-B is parallel with the axis of rotation of the wheel rim 104. In another embodiment, axially inner ledge portion 128a is at an angle β from about four degrees to about six degrees relative to a plane B-B that intersects an axially outer point 148 of single circumferentially continuous groove 130 where plane B-B is parallel with the axis of rotation of the wheel rim 104.

Further, in the illustrated embodiment, ledge portion 128 is substantially planar axially inward of single circumferentially continuous groove 130, and has no safety hump that protrudes radially outward from ledge portion 128. In an alternative embodiment (not shown), ledge portion 128 may include a safety hump. In other embodiments, circumferentially continuous surface 132 of single circumferentially continuous groove 130 can be positioned axially inwardly or outwardly relative to the location illustrated in FIG. 3.

Figure 4:
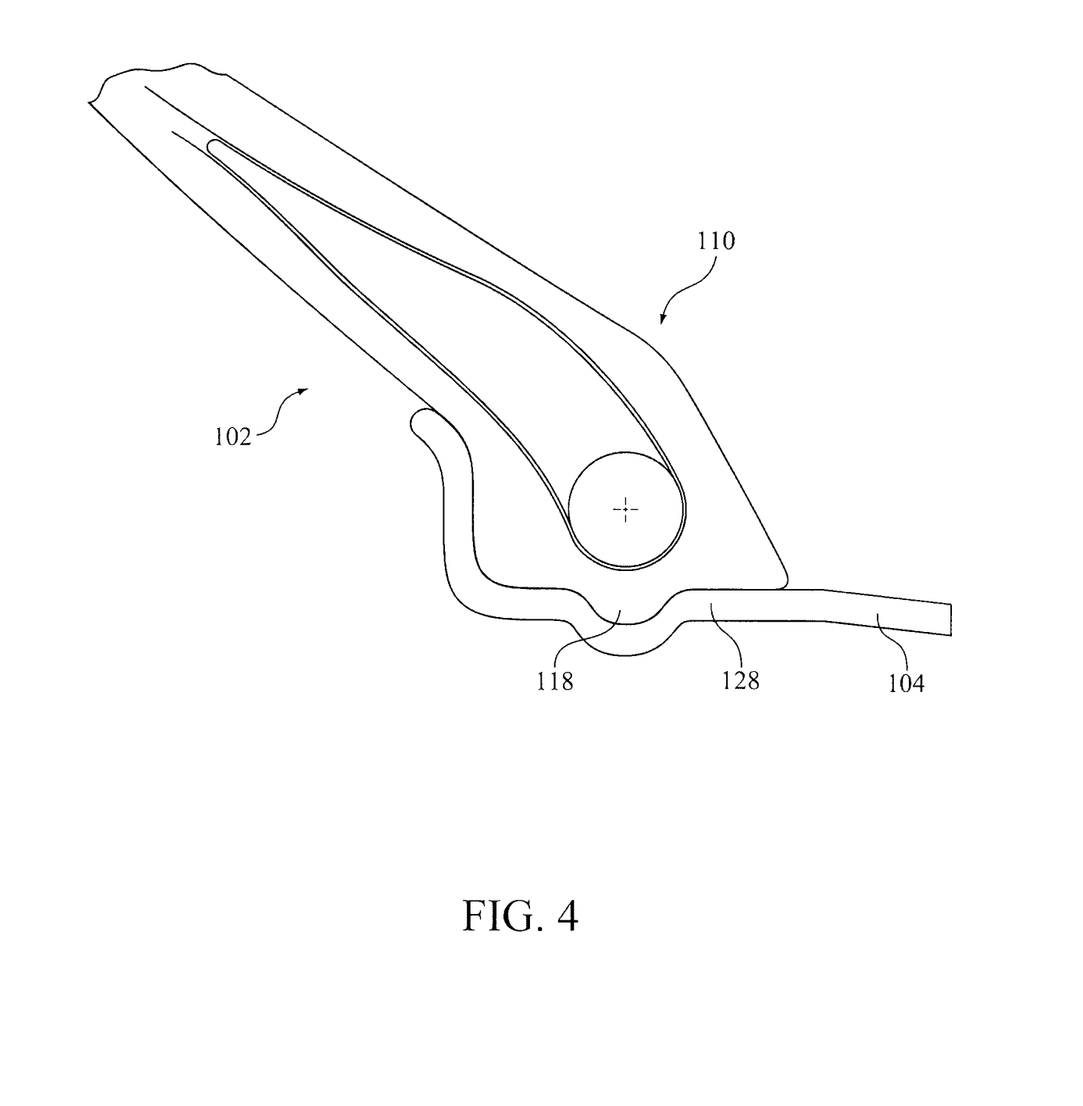
FIG. 4 illustrates a close-up cross-section of a bead region and a ledge portion of the tire and wheel rim assembly of FIG. 1.

FIG. 4 illustrates a close-up cross-section of tire and wheel rim assembly 100 of FIG. 1 at the interface of bead region 110 of tire 102 and ledge portion 128 of wheel rim 104. Single circumferentially continuous rib 118 of tire 102 fits in single circumferentially continuous groove 130 (see item 130 in FIG. 3) of wheel rim 104 such that bead region 110 and single circumferentially continuous rib 118 are in a seating position on ledge portion 128, in both inflated and non-inflated conditions. Because single circumferentially continuous rib 118 is seated in single circumferentially continuous groove 130 in a stable equilibrium position, a force is required to move single circumferentially continuous rib 118 radially upward out of single circumferentially continuous groove 130 of ledge portion 128. In addition, the fit between rib 118 and groove 130 causes the bead region 110 to sit uniformly on ledge portion 128 of wheel rim 104 and bead region 110 at a stable and secure position.

Bead region 110 is at its most stable and secure position and is most resistant to axial movement when the tire 102 of the tire and wheel rim assembly 100 is least radially stretched. In an inflated condition, the bead region 110 and the single circumferentially continuous rib 118 tends to stay in the single circumferentially continuous groove 130 of the wheel rim 104 because this position is a normal position for the tire 102. A stretched or non-normal position is when the single circumferentially continuous rib 118 is not in the single circumferentially continuous groove 130, but rather unseated on the ledge portion 128. Another example of a stretched or non-normal position is when a tire is dismounted from the wheel rim because the bead bundle 112 needs to be stretched and the circumferentially continuous rib 118 needs to be compressed, both requiring an input of energy, to successfully dislodge the rib from the groove as the tire is dismounted.

Figure 5A:
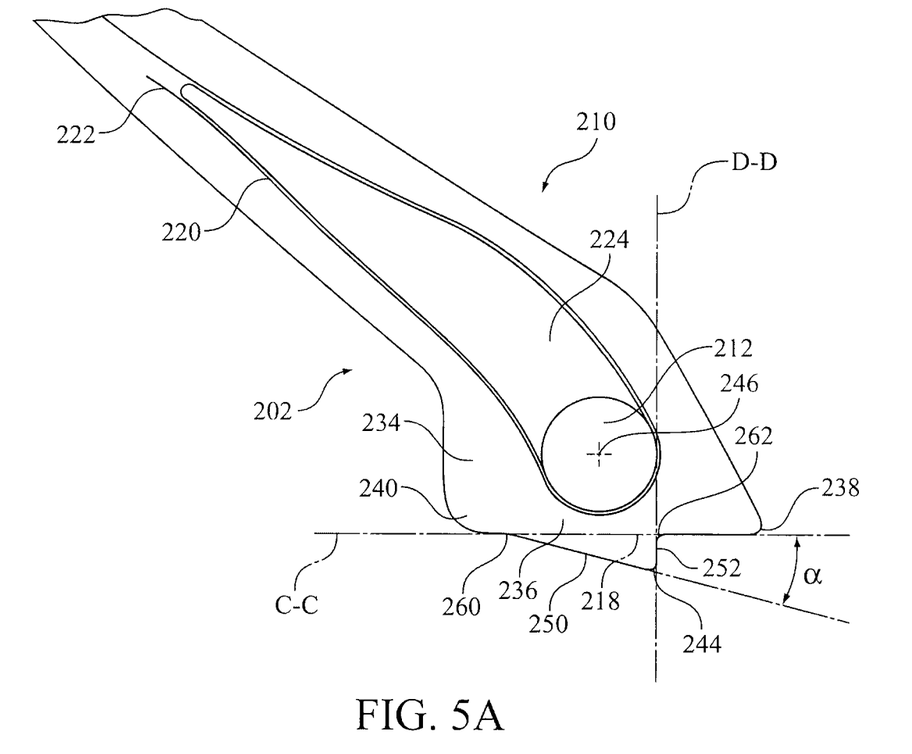
FIG. 5A illustrates a close-up cross-section of a bead region of a tire of an alternative embodiment of a tire and wheel rim assembly.
Figure 5B:
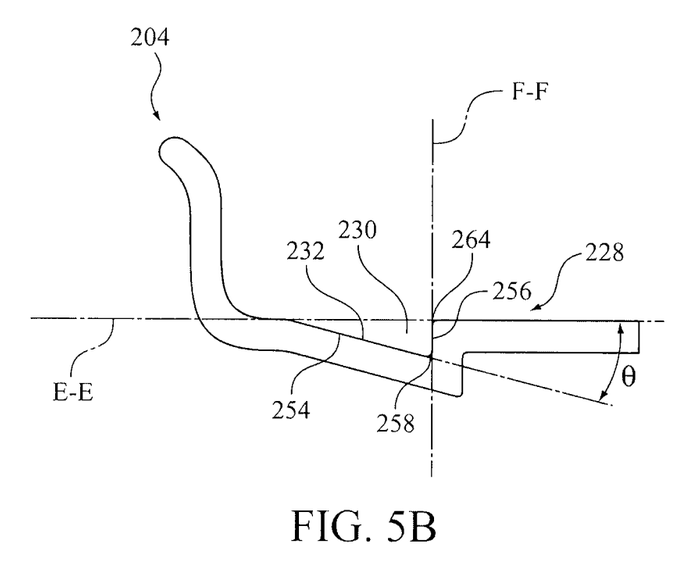
FIG. 5B illustrates a close-up cross-section of a flange portion and a ledge portion of a wheel rim of an alternative embodiment of a tire and wheel rim assembly.

FIG. 5A illustrates a close-up cross-section of a portion of a tire 202 and FIG. 5B illustrates a close-up cross-section of a portion of a wheel rim 204, both components of an alternative embodiment of a tire and wheel rim assembly. The tire and wheel rim assembly is substantially the same as the tire and wheel rim assembly 100 of FIGS. 1-4, except for the differences discussed below. In the illustrated embodiment of FIG. 5A, tire 202 is substantially the same as tire 102, except it includes a single circumferentially Continuous wedge shaped rib 218. Single circumferentially continuous wedge shaped rib 218 comprises a first tapered edge 250 and a second tapered edge 252 that meet at a peak 244. First tapered edge 250 is at an angle $\alpha$ relative to a plane C-C, where plane C-C is parallel with the axis of rotation of the tire 202 and intersects second tapered edge 252 at a point 262 located at the base of second tapered edge 252. In one embodiment, angle $\alpha$ may vary from about ten degrees to about eighty degrees. In another embodiment, angle $\alpha$ may vary from about twenty degrees to about seventy degrees. In yet another embodiment, angle $\alpha$ may vary from about thirty degrees to about sixty degrees. In another embodiment, angle $\alpha$ may vary from about forty degrees to about sixty degrees.

In yet another embodiment, angle $\alpha$ may vary from about thirty-five degrees to about fifty-five degrees. In another embodiment, angle $\alpha$ may vary from about thirty-five degrees to about forty-five degrees. In another embodiment, angle $\alpha$ may vary from about forty degrees to about fifty degrees. In another embodiment, angle $\alpha$ may vary from about forty degrees to about forty-five degrees.

Second tapered edge 252 is substantially parallel to the equatorial plane $E_p$ and intersects ledge portion 236 at point 262. In other embodiments, second tapered edge 252 is at an angle $\delta$ (not shown) relative to a plane D-D where plane D-D is parallel to the equatorial plane $E_p$ of the tire and intersects ledge portion 236 at point 262. Angle $\delta$ may vary from about negative forty-five degrees to about positive sixty degrees relative to plane D-D. In another embodiment, angle $\delta$ may vary from about negative thirty degrees to about positive forty-five degrees relative to plane D-D. In yet another embodiment, angle $\delta$ may vary from about negative fifteen degrees to about positive thirty degrees relative to plane D-D. In another embodiment, angle $\delta$ may vary from about zero degrees to about positive thirty degrees relative to plane D-D. In yet another embodiment, angle $\delta$ may vary from about zero degrees to about positive fifteen degrees relative to plane D-D. In another embodiment, angle $\delta$ may vary from about zero degrees to about negative thirty degrees relative to plane D-D.

In yet another embodiment, angle $\delta$ may vary from about negative ten degrees to about positive ten degrees relative to plane D-D. In another embodiment, angle $\delta$ may vary from about negative fifteen degrees to about zero degrees relative to plane D-D. In yet another embodiment, angle $\delta$ may vary from about negative ten degrees to about negative five degrees relative to plane D-D. In another embodiment, angle $\delta$ may vary from negative five degrees to about negative ten degrees relative to plane D-D. In another embodiment, angle $\delta$ may vary from about positive ten degrees to about positive twenty degrees relative to plane D-D. In yet another embodiment, angle $\delta$ may vary from about negative fifteen degrees to about negative ten degrees relative to plane D-D. In another embodiment, angle $\delta$ may vary from negative five degrees to about positive five degrees relative to plane D-D. In another embodiment, angle $\delta$ may vary from about positive ten degrees to about positive fifteen degrees relative to plane D-D. In yet another embodiment, angle $\delta$ may vary from about zero degrees to about positive ten degrees relative to plane D-D.

In the illustrated embodiment, peak 244 is offset axially inward relative to a center 246 of bead core 212, towards toe 238. In an alternative embodiment (not shown), single circumferentially continuous wedge shaped rib 218 can be positioned axially inward or outward relative to the location illustrated in FIG. 5A. In yet another alternative embodiment, the peak 244 may be positioned axially an axial distance inward or outward from an axial perimeter of the bead core 212. For example, in one known embodiment, peak 244 may be offset from the center 246 of bead core 212 a distance of up to 0.75 times the bead width BW (illustrated in FIG. 2) in either axial direction. In another embodiment, peak 244 may be offset from the center 246 of bead core 212 a distance from about 0.60 to about 0.85 times the bead width BW (illustrated in FIG. 2) in either axial direction. In yet another alternative embodiment (not shown), single circumferentially continuous wedge shaped rib 216 can be another rib shape, e.g., a portion of a square, rectangle, pentagon, polygon, or any other shape.

A correspondingly configured wheel rim 204 is illustrated in FIG. 5B. The wheel rim 204 is substantially the same as wheel rim 104 of FIGS. 1-4, except for the differences discussed below. In the illustrated embodiment of FIG. 5B, wheel rim 204 is substantially the same as wheel rim 104, except it includes a single circumferentially continuous groove 230 that has a circumferentially continuous wedge shaped surface 232 comprising a first groove surface 254 and a second groove surface 256 that meet at a groove point 258. First groove surface 254 is at an angle $\theta$ that is approximately equal to angle $\alpha$ of the tire 202 illustrated in FIG. 5A. First groove surface 254 is at an angle $\theta$, relative to a plane E-E, where plane E-E is parallel with the axis of rotation of the tire 202 and intersects second groove surface 256 at a point 264 where second groove surface 256 intersects ledge portion 228. In one embodiment, angle θ may vary from about ten degrees to about eighty-five degrees. In another embodiment, angle θ may vary from about twenty degrees to about eighty-five degrees. In one embodiment, angle θ may vary from about thirty degrees to about eighty-five degrees. In another embodiment, angle θ may vary from about twenty degrees to about seventy-five degrees. In yet another embodiment, angle θ may vary from about thirty degrees to about sixty-five degrees. In another embodiment, angle θ may vary from about forty degrees to about sixty-five degrees.

In yet another embodiment, angle θ may vary from about thirty-five degrees to about fifty-five degrees. In another embodiment, angle θ may vary from about forty degrees to about sixty-five degrees. In one embodiment, angle θ may vary from about fifty degrees to about sixty degrees. In another embodiment, angle θ may vary from about fifty-five degrees to about sixty-five degrees. In yet another embodiment, angle θ may vary from about thirty-five degrees to about forty-five degrees. In another embodiment, angle θ may vary from about forty degrees to about fifty degrees. In yet another embodiment, angle θ may vary from about fifty degrees to about fifty-five degrees. In another embodiment, angle θ may vary from about fifty-five degrees to about sixty degrees. In yet another embodiment, angle θ may vary from about thirty degrees to about forty-five degrees.

In the illustrated embodiment, second groove surface 256 is substantially parallel to the equatorial plane $E_p$ and intersects ledge portion 228 at point 264. In other embodiments, second groove surface 256 is at an angle λ (not shown) relative to a plane F-F where plane F-F is parallel to the equatorial plane $E_p$ of the wheel rim 204 and intersects ledge portion 228 at point 264. Angle λ may vary from about negative forty-five degrees to about positive sixty degrees relative to plane F-F. In another embodiment, angle λ may vary from about negative twenty-five degrees to about positive fifty degrees relative to plane F-F. In yet another embodiment, angle λ may vary from about negative twenty degrees to about positive thirty-five degrees relative to plane F-F. In another embodiment, angle λ may vary from about negative five degrees to about positive thirty-five degrees relative to plane F-F. In yet another embodiment, angle λ may vary from about negative five degrees to about positive twenty degrees relative to plane F-F. In another embodiment, angle λ may vary from about negative thirty degrees to about zero degrees relative to plane F-F.

In yet another embodiment, angle λ may vary from about negative five degrees to about positive fifteen degrees relative to plane F-F. In another embodiment, angle λ may vary from about negative ten degrees to about positive fifty degrees relative to plane F-F. In yet another embodiment, angle λ may vary from about negative twenty-five degrees to about positive five degrees relative to plane F-F. In another embodiment, angle λ may vary from about zero degrees to about positive twenty degrees relative to plane F-F. In yet another embodiment, angle λ may vary from about negative five degrees to about positive fifteen degrees relative to plane F-F. In another embodiment, angle λ may vary from about positive five degrees to about positive ten degrees relative to plane F-F. In yet another embodiment, angle λ may vary from about negative five degrees to about zero degrees relative to plane F-F. In another embodiment, angle λ may vary from about zero degrees to about positive ten degrees relative to plane F-F.

In the illustrated embodiment, groove point 258 is offset axially inward towards the equatorial plane $E_p$. In an alternative embodiment (not shown), single circumferentially continuous groove 230 can be positioned axially inward or axially outward relative to the location illustrated in FIG. 5B. In yet another alternative embodiment, groove point 258 may be axially offset an axial distance inward or outward from an axial perimeter of the bead core 212 (illustrated in FIG. 5A). For example, in one known embodiment, groove point 258 may be a distance of up to 0.77 times the bead width BW (illustrated in FIG. 2) in either axial direction. In another alternative embodiment (not shown), single circumferentially continuous groove 230 that has a circumferentially continuous wedge shaped surface 232 can be another shaped surface, e.g., a portion of a square, rectangle, pentagon, polygon, or the like.

Figure 6A:
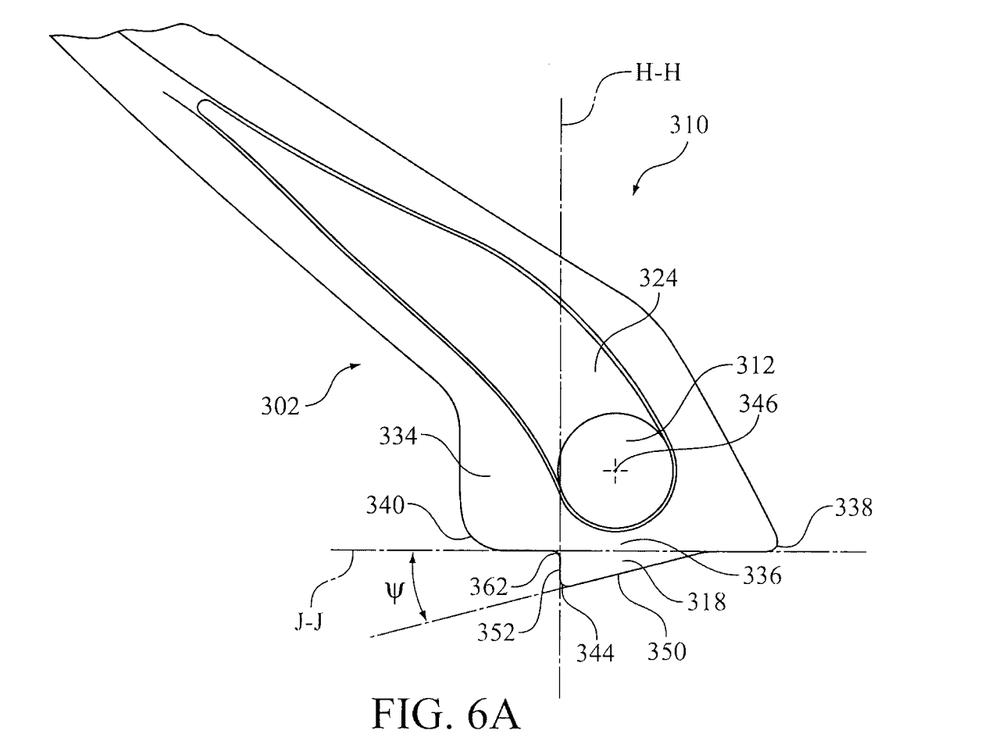
FIG. 6A illustrates a close-up cross-section of a bead region of a tire of another alternative embodiment of a tire and wheel rim assembly.
Figure 6B:
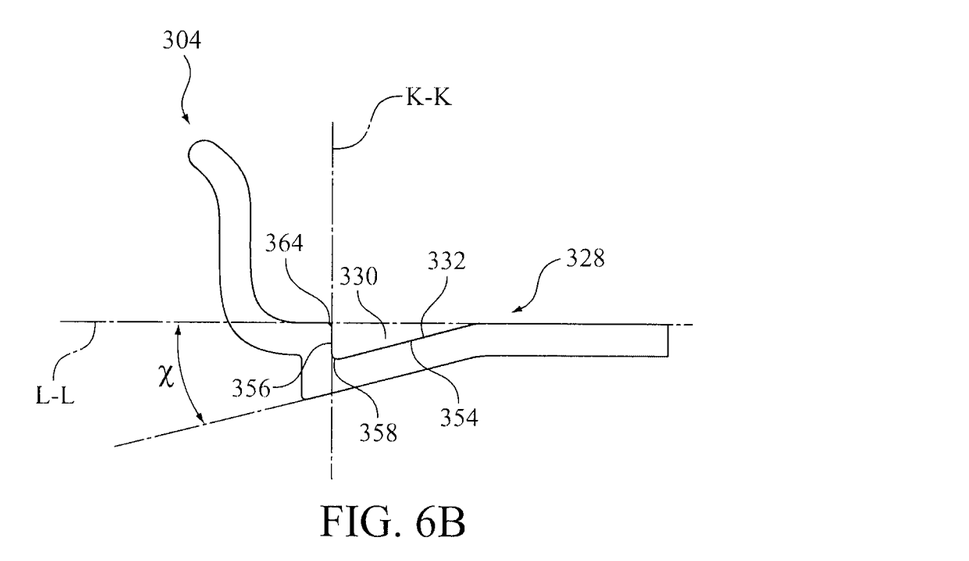
FIG. 6B illustrates a close-up cross-section of a flange portion and a ledge portion of a wheel rim of another alternative embodiment of a tire and wheel rim assembly.

FIG. 6A illustrates a close-up cross-section of a portion of a tire 302 and FIG. 6B illustrates a close-up cross-section of a portion of a wheel rim 304, both of another alternative embodiment of a tire and wheel rim assembly. Tire and wheel rim assembly is substantially the same as the tire and wheel rim assembly 100 of FIGS. 1-4, except for the differences discussed below. In the illustrated embodiment of FIG. 6A, tire 302 is substantially the same as tire 102, except it includes a single circumferentially continuous wedge shaped rib 318. Single circumferentially continuous wedge shaped rib 318 comprises a first tapered edge 350 and a second tapered edge 352 that meet at a peak 344. First tapered edge 350 is at an angle ψ relative to a plane J-J, where plane J-J is parallel with the axis of rotation of the tire 302 and intersects the second tapered edge 352 at a point 362 located at the base of second tapered edge 352. In one embodiment, angle ψ may vary from about negative ten degrees to about negative eighty degrees relative to a plane J-J. In another embodiment, angle ψ may vary from about negative twenty degrees to about negative seventy degrees relative to a plane J-J. In yet another embodiment, angle ψ may vary from about negative thirty degrees to about negative sixty degrees relative to a plane J-J. In another embodiment, angle ψ may vary from about negative forty degrees to about negative sixty degrees relative to a plane J-J.

In yet another embodiment, angle ψ may vary from about negative thirty degrees to about negative fifty-five degrees relative to a plane J-J. In another embodiment, angle ψ may vary from about negative thirty degrees to about negative forty degrees relative to a plane J-J. In yet another embodiment, angle ψ may vary from about negative forty degrees to about negative fifty degrees relative to a plane J-J. In another embodiment, angle ψ may vary from about negative forty-five degrees to about negative fifty degrees relative to a plane J-J. In another embodiment, angle ψ may vary from about negative forty degrees to about negative forty-five degrees relative to a plane J-J.

Second tapered edge 352 is substantially parallel to the equatorial plane $E_p$ and intersects ledge portion 336 at a point 362. In other embodiments, second tapered edge 352 is at an angle μ (not shown) relative to a plane H-H where plane H-H is parallel to the equatorial plane $E_p$ of the tire and intersects ledge portion 328 at point 362. Angle μ may vary from about negative sixty degrees to about positive forty-five degrees relative to plane H-H. In another embodiment, angle μ may vary from about negative forty-five degrees to about positive thirty degrees relative to plane H-H. In yet another embodiment, angle μ may vary from about negative thirty degrees to about positive fifteen degrees relative to plane H-H. In another embodiment, angle μ may vary from about zero degrees to about negative thirty degrees relative to plane H-H. In yet another embodiment, angle μ may vary from about zero degrees to about negative fifteen degrees relative to plane H-H. In another embodiment, angle μ may vary from about zero degrees to about positive fifteen degrees relative to plane H-H.

In yet another embodiment, angle μ may vary from about negative fifteen degrees to about positive ten degrees relative to plane H-H. In another embodiment, angle μ may vary from about negative five degrees to about positive five degrees relative to plane H-H. In yet another embodiment, angle μ may vary from about negative ten degrees to about positive five degrees relative to plane H-H. In another embodiment, angle μ may vary from about zero degrees to about negative fifteen degrees relative to plane H-H. In yet another embodiment, angle μ may vary from about zero degrees to about negative ten degrees relative to plane H-H. In another embodiment, angle μ may vary from about zero degrees to about positive five degrees relative to plane H-H.

In the illustrated embodiment, peak 344 is offset axially outward relative to a center 346 of bead core 312, towards heel 340. In an alternative embodiment (not shown), single circumferentially continuous wedge shaped rib 318 can be positioned axially inward or outward relative to the location illustrated in FIG. 6A. In yet another alternative embodiment, peak 344 may be axially offset an axial distance inward or outward from an axial perimeter of bead core 312. For example, in one known embodiment, peak 344 may be offset from the center 346 of bead core 312 a distance up to 0.75 times the bead width BW (illustrated in FIG. 2) in either axial direction. In another known embodiment, peak 344 may be offset from the center 346 of bead core 312 a distance up to about 0.6 to about 0.8 times the bead width BW (illustrated in FIG. 2) in either axial direction. In yet another alternative embodiment (not shown), single circumferentially continuous wedge shaped rib 316 can be another rib shape, e.g., a portion of a square, rectangle, pentagon, polygon, or any other shape.

A correspondingly configured wheel rim 304 is illustrated in FIG. 6B. The wheel rim 304 is substantially the same as wheel rim 104 of FIGS. 1-4, except for the differences discussed below. In the illustrated embodiment of FIG. 6B, wheel rim 304 is substantially the same as wheel rim 104, except it includes a single circumferentially continuous groove 330 that has a circumferentially continuous wedge shaped surface 332 comprising a first groove surface 354 and a second groove surface 356 that meet at a groove point 358. First groove surface 354 is at an angle χ that is approximately equal to angle ψ of the tire 302 illustrated in FIG. 6A.

First groove surface 354 is at an angle χ relative to a plane L-L, where plane L-L is parallel with the axis of rotation of wheel rim 304 and intersects second groove surface 356 at a point 364 where second groove surface 356 intersects ledge portion 328. In one embodiment, angle χ may vary from about negative ten degrees to about negative eighty-five degrees relative to a plane L-L. In another embodiment, angle χ may vary from about negative twenty degrees to about negative seventy-five degrees relative to a plane L-L. In yet another embodiment, angle χ may vary from about negative thirty degrees to about negative sixty-five degrees relative to a plane L-L. In another embodiment, angle χ may vary from about negative forty degrees to about negative sixty-five degrees relative to a plane L-L.

In yet another embodiment, angle χ may vary from about negative forty degrees to about negative sixty degrees relative to a plane L-L. In another embodiment, angle χ may vary from about negative forty degrees to about negative fifty degrees relative to a plane L-L. In another embodiment, angle χ may vary from about negative thirty degrees to about negative forty-five degrees relative to a plane L-L.

In the illustrated embodiment, second groove surface 356 is substantially parallel to the equatorial plane $E_p$ and intersects ledge portion 328 at a point 364. In other embodiments, second groove surface 356 is at an angle σ (not shown) relative to a plane K-K where plane K-K is parallel to the equatorial plane $E_p$ of the wheel rim 304 and intersects ledge portion 328 at point 364. The angle σ may vary from about negative sixty-five degrees to about positive fifty degrees relative to plane K-K. In another embodiment, angle σ may vary from about negative fifty degrees to about positive thirty-five degrees relative to plane K-K. In yet another embodiment, angle σ may vary from about negative thirty-five degrees to about positive twenty degrees relative to plane K-K. In another embodiment, angle μ may vary from about zero degrees to about negative thirty-five degrees relative to plane K-K. In yet another embodiment, angle σ may vary from about zero degrees to about negative twenty degrees relative to plane K-K. In another embodiment, angle σ may vary from about zero degrees to about positive twenty degrees relative to plane K-K.

In yet another embodiment, angle σ may vary from about negative ten degrees to about positive ten degrees relative to plane K-K. In another embodiment, angle σ may vary from about negative ten degrees to about zero degrees relative to plane K-K. In yet another embodiment, angle σ may vary from about negative ten degrees to about negative five degrees relative to plane K-K. In another embodiment, angle μ may vary from about zero degrees to about negative fifteen degrees relative to plane K-K. In yet another embodiment, angle σ may vary from about zero degrees to about positive ten degrees relative to plane K-K. In another embodiment, angle σ may vary from about negative fifteen to about negative ten degrees relative to plane K-K. In another embodiment, angle μ may vary from about negative five degrees to about positive five degrees relative to plane K-K. In yet another embodiment, angle σ may vary from about negative twenty degrees to about zero degrees relative to plane K-K. In another embodiment, angle σ may vary from about zero degrees to about positive ten degrees relative to plane K-K.

In the illustrated embodiment, groove point 358 is offset axially outward away from equatorial plane $E_p$. In an alternative embodiment (not shown), single circumferentially continuous groove 330 can be positioned axially inward or outward relative to the location illustrated in FIG. 6B. In yet another alternative embodiment, groove point 358 may be axially offset an axial distance inward or outward from an axial perimeter of the bead core 312 (illustrated in FIG. 6A). For example, in one known embodiment, groove point 358 may be a distance of up to 0.77 times the bead width BW (illustrated in FIG. 2) in either axial direction. In another alternative embodiment (not shown), single circumferentially continuous groove 330 that has a circumferentially continuous wedge shaped surface 332 can be another shaped surface, e.g., a portion of a square, rectangle, pentagon, polygon, or the like.

Figure 7:
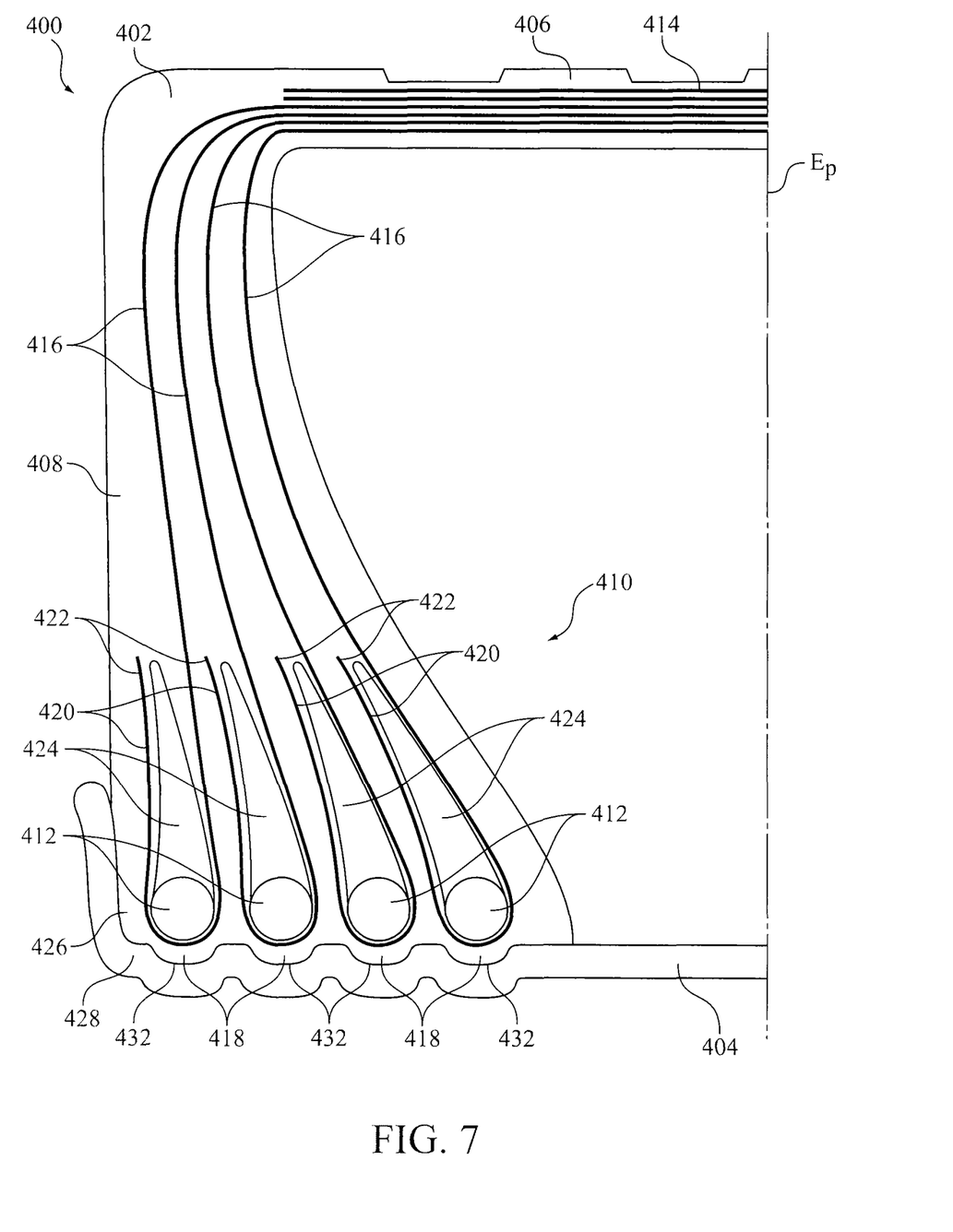
FIG. 7 illustrates a partial cross-section of a multiple bead tire and wheel rim assembly.

FIG. 7 illustrates a partial cross-section of another embodiment of a tire and wheel rim assembly 400. Tire and wheel rim assembly 400 includes a tire 402 and a wheel rim 404. Although only an outer half of the tire and wheel rim assembly 400 is depicted in the drawing, it will be appreciated that the inner half of the tire and wheel rim assembly 400 is substantially a mirror image of the half depicted. Tire and wheel rim assembly 400 is substantially the same as the tire and wheel rim assembly 100, 200, and 300 of FIGS. 1-4, 5A-5B, and 6A-6B, respectively, except for the differences discussed below.

The illustrated tire 402 has an equatorial plane $E_p$ and includes a tread 406, a sidewall 408, a bead region 410 including at least one bead core 412, a belt portion that includes at least two belts 414, and at least one carcass ply 416 that extends circumferentially about tire 402 from the at least one bead core 412 in one bead region 410 to a corresponding bead core 412 in the other bead region (not shown). The tire 102 further includes at least one circumferentially continuous rib 418 where the number of ribs equals the number of bead cores. The at least one carcass ply 416 is wound outwardly about each of the at least one bead core 412 and extends upwardly towards tread 406 to form at least one tune-up portion 420. The at least one turn-up portion 420 terminates at least one turn-up end 422. In the illustrated embodiments, tire 102 includes at least one bead filler 424. In the illustrated embodiment, tire 402 includes four bead cores 412, each with at least one carcass ply 416 extending circumferentially about tire 402 from one of the at least one bead cores 412 in one bead region 410 to a corresponding bead core in the other bead region (not shown). In another embodiment (not shown), tire 402 may include between two and nine bead cores 412 and a corresponding number of carcass plies 416. In yet another embodiment, each bead core 412 may have from one to eight carcass plies 416 and an equal number of turn-up portions 420.

With continued reference to FIG. 7, wheel rim 404 has a flange portion 426 and a ledge portion 428. In the illustrated embodiment, ledge portion 428 includes at least one circumferentially continuous groove (item 430, not shown in FIG. 7) that comprises a circumferentially continuous surface 432 having a shape corresponding to the at least one circumferentially continuous rib 418. In the illustrated embodiment (not shown), wheel rim 404 includes four circumferentially continuous grooves 430 that comprise circumferentially continuous surfaces 432.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application illustrates various embodiments, and while these embodiments have been described in some detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative embodiments, and illustrative examples shown and described. Accordingly, departures may be made from such details without departing from the spirit or scope of the applicant's general inventive concept.

What is claimed is:

1. A tire and wheel rim assembly comprising:
   a wheel rim having two axially spaced ledge portions and two axially spaced flange portions,
   wherein each ledge portion is substantially parallel to the axis of the wheel, and has a single circumferentially continuous groove with a circumferentially continuous surface disposed therein; and
   a tire having two axially spaced bead regions, wherein each bead region includes a bead core, a ledge-engaging portion having a toe, a heel, and a single circumferentially continuous rib with a peak, and wherein each bead region further includes a flange-engaging portion adjacent to the heel of the ledge-engaging portion,
   wherein the flange-engaging portion of each bead region is in contact with one of the flange portion of the wheel rim and is positioned such that an axially-outermost end of the flange portion of the wheel rim is axially outward of the bead core of the tire,
   wherein the ledge-engaging portion of each bead region is in contact with one of the ledge portions of the wheel rim,
   wherein the single circumferentially continuous rib is spaced apart from the toe and the heel and is radially below a bead center of a bead core, and
   wherein the single circumferentially continuous rib extends radially into the single circumferentially continuous groove without contacting the flange portion of the wheel rim.

2. The tire and wheel rim assembly of claim 1, wherein the single circumferentially continuous rib in the tire has a convex shape with a radial height and an axial width, the axial width of the single circumferentially continuous rib is about 0.75 to about 1.5 times a bead width of the bead core and the radial height of the single circumferentially continuous rib is about 0.1 to about 1.0 times a bead height of the bead core, and the single circumferentially continuous groove in the wheel rim has a concave shape with a radial height and an axial width, the axial width of the single circumferentially continuous groove is about 0.77 to about 1.52 times the bead width of the bead core and the radial height of the single circumferentially continuous groove is about 0.12 to about 1.02 times the bead height of the bead core.

3. The tire and wheel rim assembly of claim 1, wherein the peak of the single circumferentially continuous rib is directly below the center of the bead core, such that a plane drawn through the peak of the single circumferentially continuous rib and the center of the bead core is parallel with an equatorial plane of the tire.

4. The tire and wheel rim assembly of claim 1, wherein the single circumferentially continuous rib has a single radius.

5. The tire and wheel rim assembly of claim 1, wherein the single circumferentially continuous rib of the tire has a partial rectangle shape or a partial polygon shape.

6. The tire and wheel rim assembly of claim 1, wherein the single circumferentially continuous rib of the tire is a wedge shaped rib having a first tapered edge and a second tapered edge that meet tangentially at the peak and wherein the single circumferentially continuous groove of the wheel rim has a circumferentially continuous shaped surface corresponding to the wedge shaped rib.

7. The tire and wheel rim assembly of claim 6, wherein the peak of the wedge shaped rib is offset in an axial direction relative to the center of the bead core a distance up to about 0.60 to about 0.85 times a bead width of the bead core.

8. The tire and wheel rim assembly of claim 6, wherein the peak of the single circumferentially continuous rib is axially offset towards the toe relative to the bead center of the bead core.

9. The tire and wheel rim assembly of claim 8, wherein the first tapered edge is at an angle from about 10 degrees to about 80 degrees relative to a first plane that is parallel with an axis of rotation of the tire and where the first plane intersects the second tapered edge at a base of the second tapered edge, and the second tapered edge is at an angle from about negative 45 degrees to about positive 60 degrees relative to a second plane that is parallel to an equatorial plane of the tire and where the second plane intersects the ledge-engaging portion at the base of the second tapered edge.

10. The tire and wheel rim assembly of claim 6, wherein the peak of the single circumferentially continuous rib is axially offset towards the heel relative to the bead center.

11. The tire and wheel rim assembly of claim 10, wherein the first tapered edge is at an angle from about negative 10 degrees to about negative 80 degrees relative to a first plane that is parallel with an axis of rotation of the tire and where the first plane intersects the second tapered edge at a base of the second tapered edge, and the second tapered edge is at an angle from about negative 60 degrees to about positive 45 degrees relative to a second plane that is parallel to an equatorial plane of the tire and where the second plane intersects the ledge-engaging portion at the base of the second tapered edge.

12. The tire and wheel rim assembly of claim 10, wherein the circumferentially continuous shaped surface of the wheel rim further comprises a first groove surface and a second groove surface, and wherein the first groove surface is at an angle from about negative 10 degrees to about negative 85 degrees relative to a first plane that is parallel with an axis of rotation of the wheel rim and where the first plane intersects a base of the second groove surface, and the second groove surface is at an angle from about negative 45 degrees to about positive 60 degrees relative to a second plane that is parallel to an equatorial plane of the wheel rim and where the second plane intersects a ledge-engaging portion of the wheel rim at the base of the second groove surface.

13. The tire and wheel rim assembly of claim 1, wherein the single circumferentially continuous rib is in a normal, non-stretched position, with respect to the groove.

14. The tire and wheel rim assembly of claim 1, wherein the assembly is a runflat tire and wheel rim assembly.

15. The tire and wheel rim assembly of claim 1, wherein the assembly is a non-runflat tire and wheel rim assembly.

16. The tire and wheel assembly of claim 1, wherein the single circumferentially continuous rib is present on the ledge-engaging portion of each bead region of the tire when the bead regions are not in contact with another object.

17. The tire and wheel assembly of claim 1, wherein the single circumferentially continuous rib on the ledge-engaging portion of each bead region of the tire is a preformed, single circumferentially continuous rib.

18. A tire comprising:
two axially spaced bead regions, each bead region including a bead core, a ledge-engaging portion and a flange-engaging portion,
wherein the flange-engaging portion is configured to contact a flange of a wheel rim such that an axially-outermost end of the flange of the wheel is axially outward of the bead core of the tire,
wherein when the bead regions are not in contact with another object, the ledge-engaging portion comprises a first portion extending from a toe, a second portion extending from a heel, and at least one circumferentially continuous rib including a peak separating the first portion from the second portion, wherein the first portion is substantially coplanar with the second portion,
wherein each of the at least one circumferentially continuous rib is spaced from the toe and the heel and directly below a bead core with a bead center, such that a plane drawn through a peak of each circumferentially continuous rib and the corresponding bead center is parallel with an equatorial plane of the tire, and
wherein each of the at least one circumferentially continuous ribs is configured to be received in a corresponding groove in a wheel rim.

19. The tire of claim 18, wherein the at least one circumferentially continuous rib in the tire has a convex shape with a radial height and an axial width that are a function of a bead height or a bead width of the at least one bead core.

20. The tire of claim 18, wherein the at least one circumferentially continuous rib has a single radius.

21. The tire of claim 18, wherein the at least one circumferentially continuous rib in the tire has at least one wedge shaped rib that comprises a first tapered edge and a second tapered edge that meet tangentially at the peak, wherein the at least one circumferentially continuous rib is associated with a single bead core with a bead center.

22. The tire of claim 18, wherein the tire is a runflat tire.

23. The tire of claim 18, wherein the at least one circumferentially continuous rib is a preformed, circumferentially continuous rib.

* * * * *